(12) United States Patent
Chang

(10) Patent No.: US 12,221,019 B2
(45) Date of Patent: Feb. 11, 2025

(54) VEHICLE RECLINER

(71) Applicant: HYUNDAI TRANSYS INCORPORATED, Seosan-si (KR)

(72) Inventor: Seung Hun Chang, Hwaseong-si (KR)

(73) Assignee: HYUNDAI TRANSYS INCORPORATED, Seosan-si (KR)

( * ) Notice: Subject to any disclaimer, the term of this patent is extended or adjusted under 35 U.S.C. 154(b) by 11 days.

(21) Appl. No.: 17/857,612

(22) Filed: Jul. 5, 2022

(65) Prior Publication Data
US 2023/0009295 A1    Jan. 12, 2023

(30) Foreign Application Priority Data
Jul. 12, 2021   (KR) .................. 10-2021-0091004

(51) Int. Cl.
*B60N 2/225*    (2006.01)
(52) U.S. Cl.
CPC ............................. *B60N 2/2252* (2013.01)
(58) Field of Classification Search
CPC .................................................. B60N 2/2252
See application file for complete search history.

(56) References Cited

U.S. PATENT DOCUMENTS

| 11,407,337 B2* | 8/2022 | Lee | B60N 2/0232 |
| 2023/0116979 A1* | 4/2023 | Chang | B60N 2/2252 |
| | | | 296/65.01 |

FOREIGN PATENT DOCUMENTS

| DE | 10144840 A1 * | 3/2003 | ............ B60N 2/225 |
| DE | 102010035378 B3 | 10/2011 | |
| DE | 102011016656 B3 | 8/2012 | |
| FR | 2350224 A1 | 12/1977 | |
| JP | 2011-183978 A | 9/2011 | |
| JP | 2016-088371 A | 5/2016 | |
| KR | 10-2013-0003446 A | 1/2013 | |
| KR | 10-2216952 B1 | 2/2021 | |
| KR | 10-2236705 B1 | 4/2021 | |
| WO | 2008-018650 A1 | 2/2008 | |
| WO | WO-2014086824 A1 * | 6/2014 | ........... B60N 2/2252 |

* cited by examiner

*Primary Examiner* — Timothy J Brindley
(74) *Attorney, Agent, or Firm* — Bridgeway IP Law Group, PLLC; Jihun Kim

(57) ABSTRACT

Proposed is a vehicle recliner including a mobile flange including a support part located in the center of a placement space and configured to protrude upwards from a lower surface thereof, the support part being formed in a multi-step structure having a different outer diameter for each step, a cam having a corresponding step formed thereon, the corresponding step corresponding to the multi-step structure of the support part, and a gear plate eccentrically pressed by the cam so that an external gear thereof meshes with an internal gear of the mobile flange.

12 Claims, 4 Drawing Sheets

VEHICLE RECLINER

CROSS-REFERENCE TO THE RELATED APPLICATION

This application claims priority from Korean Patent Application No. 10-2021-0091004, filed Jul. 12, 2021, in the Korean Intellectual Property Office, the disclosure of which is incorporated herein by reference in its entirety.

BACKGROUND OF THE INVENTION

1. Field of the Invention

The present invention relates to a vehicle recliner, configured to form a multi-step structure in a support part that supports a cam of a mobile flange and to form a step structure corresponding to the multi-step structure of the support part in the cam corresponding to the support part through a relatively simple process, thereby increasing the strength of the recliner, reducing the weight of the recliner, forming the recliner to a compact size, and reducing manufacturing costs.

2. Description of the Related Art

A vehicle recliner is formed of a mobile flange having an internal gear formed therein, a gear plate having an external gear, the gear plate being eccentrically pressed by a cam so that the external gear meshes with the internal gear of the mobile flange, and the cam causing eccentricity of the gear plate.

Meanwhile, the recliner essentially requires strength to resist the load of passengers or the load in the event of a vehicle collision. To this end, it is necessary to secure a stable meshing area between the internal gear and the external gear and to allow the internal gear and the external gear to mesh with each other through surface contact.

Further, in the case of a recliner, the mobile flange is molded through a forging method in order to secure the strength thereof. In this case, manufacturing costs incurred during the production of the recliner are significantly high, and the manufactured recliner is too heavy. Meanwhile, in the case of forming the shape of the recliner through a fine-blanking method, although manufacturing costs are low, it is difficult to implement a required thickness at a required location on the mobile flange due to the limitations of molding.

In KR 10-2236705 B1 of the related art, it is proposed to dispose a cam sliver between the inner surface of the cam and a support part of the mobile flange in order to secure the strength of the recliner. However, in this case, when the cam is tilted even slightly due to vertical distortion thereof, surface contact between the mobile flange and the cam sliver is released, and the surface contact therebetween immediately changes to point contact, which results in abnormal wear and weak operating force. Further, there is a problem in that the required strength of tooth engagement between gears significantly deteriorates. In order to prevent the above-described problems, manufacturing tolerance should be managed very precisely. In practice, it is impossible to obtain a sufficiently low tolerance to ensure that the cam is disposed accurately at a desired vertical position. In addition, it is impossible to prevent fine deformation caused by application of excessive operation force during the manufacturing process.

The information disclosed in this Background of the Invention section is only for enhancement of understanding of the general background of the invention, and should not be taken as an acknowledgement or any form of suggestion that this information forms the related art already known to a person skilled in the art.

SUMMARY OF THE INVENTION

Therefore, the present invention has been made in view of the above problems, and it is an object of the present invention to provide a vehicle recliner, configured to form a multi-step structure in a support part that supports a cam of a mobile flange and to form a step structure corresponding to the multi-step structure of the support part in the cam corresponding to the support part through a relatively simple process, thereby increasing the strength of the recliner, reducing the weight of the recliner, forming the recliner to a compact size, and reducing manufacturing costs.

In accordance with the present invention, the above and other objects can be accomplished by the provision of a vehicle recliner including a mobile flange having an open upper portion, the open upper portion having a placement space formed therein, the mobile flange including an internal gear formed along an inner surface thereof forming the placement space, and a support part located in a center of the placement space and configured to protrude upwards from a lower surface thereof, the support part being formed in a multi-step structure having multiple steps, each step having a different outer diameter from one another, a cam disposed in the placement space of the mobile flange, the cam having an inner surface in contact with the support part, the inner surface having a corresponding step structure formed thereon, the corresponding step structure corresponding to the multi-step structure of the support part, and a gear plate disposed in the placement space of the mobile flange and configured to surround an outside of the cam, the gear plate having an external gear formed along an outer circumferential surface thereof, the gear plate being eccentrically pressed by the cam so that the external gear meshes with the internal gear of the mobile flange.

The mobile flange may have a through hole formed in a center of the lower surface thereof, and the support part may be formed to extend upwards from an edge of the through hole.

The support part may be formed to be integrated with the mobile flange through a fine-blanking method.

The multi-step structure of the support part may include a lower step and an upper step disposed at an upper portion of the lower step, and the lower step may have an outer diameter thereof larger than an outer diameter of the upper step.

The mobile flange may have a through hole formed in a center of the lower surface thereof, the lower step may be formed inside the through hole, and the upper step may be formed inside the lower step.

The mobile flange may have a through hole formed in a center of the lower surface thereof, the lower step may be formed at a location offset upwards from an inside of the through hole and may protrude upwards from the lower surface of the mobile flange, and the upper step may be formed at a location offset upwards from an inside of the lower step and may protrude upwards from the lower step.

The lower step of the mobile flange may have a flat-plate shape.

The corresponding step structure of the cam is formed by indenting a lower portion of the inner surface in contact with the support part and the corresponding step structure includes a corresponding step corresponding to an upper step of the multi-step structure of the support part.

The side surface of the corresponding step of the cam may be offset radially outwards from an inner step of the cam.

The side surface of the corresponding step of the cam and an inner step of the cam may face respective side surfaces of the multi-step structure of the support part.

An eccentric ring may be disposed between the side surface of the corresponding step of the cam and a lower step of the support part or between the inner step of the cam and an upper step of the support part.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Reference will now be made in detail to the preferred embodiments of the present invention, examples of which are illustrated in the accompanying drawings. Wherever possible, the same reference numbers will be used throughout the drawings to refer to the same or like parts.

The present invention relates to a vehicle recliner, configured to form a multi-step structure in a support part that supports a cam of a mobile flange and to form a step structure corresponding to the multi-step structure of the support part in the cam corresponding to the support part through a relatively simple process, thereby increasing the strength of the recliner, reducing the weight of the recliner, forming the recliner to a compact size, and reducing manufacturing costs.

Figure 1:
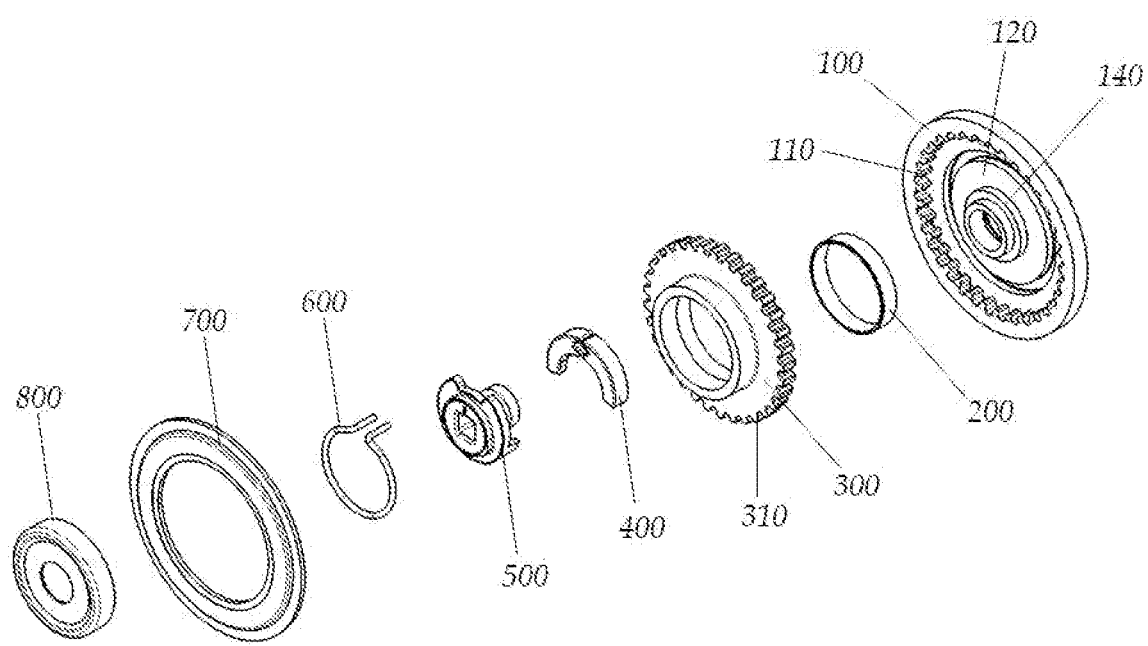
FIG. 1 is an exploded perspective view of a vehicle recliner according to an embodiment of the present invention.
Figure 2:
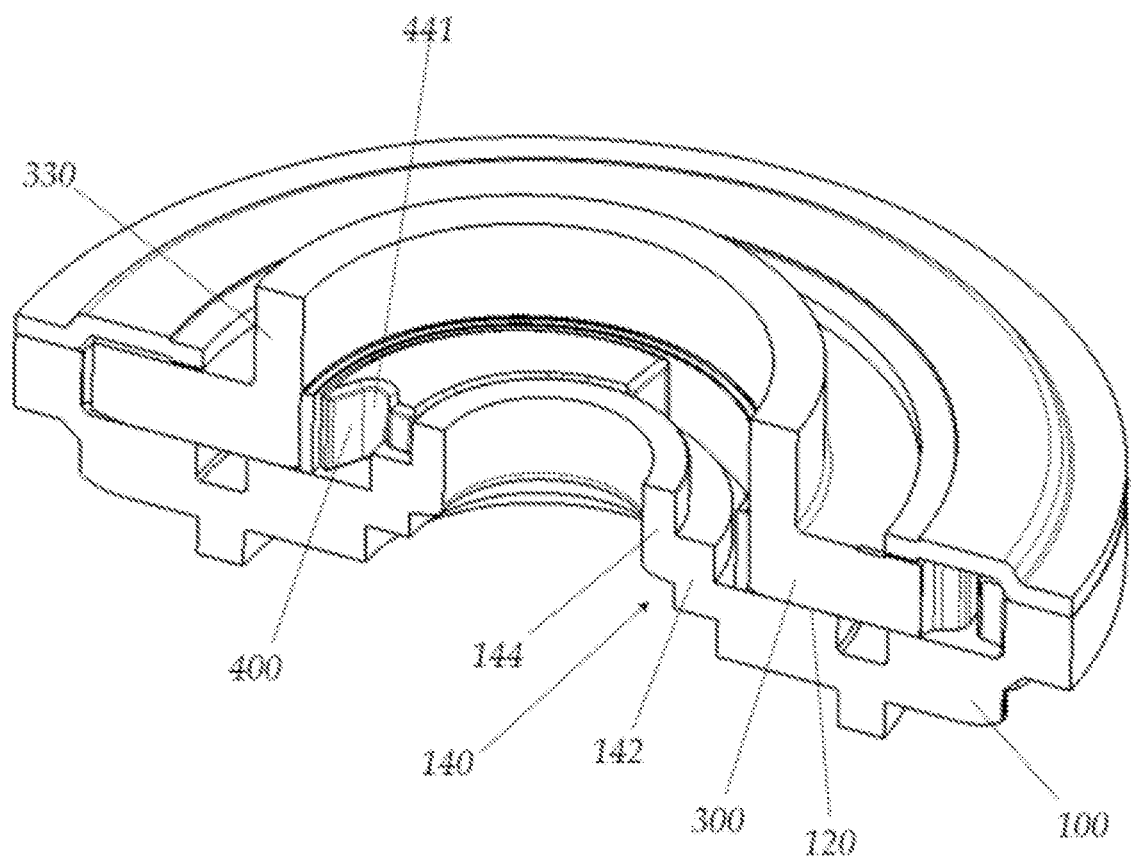
FIG. 2 is a view showing the assembled state of the vehicle recliner according to the embodiment of the present invention.
Figure 3:
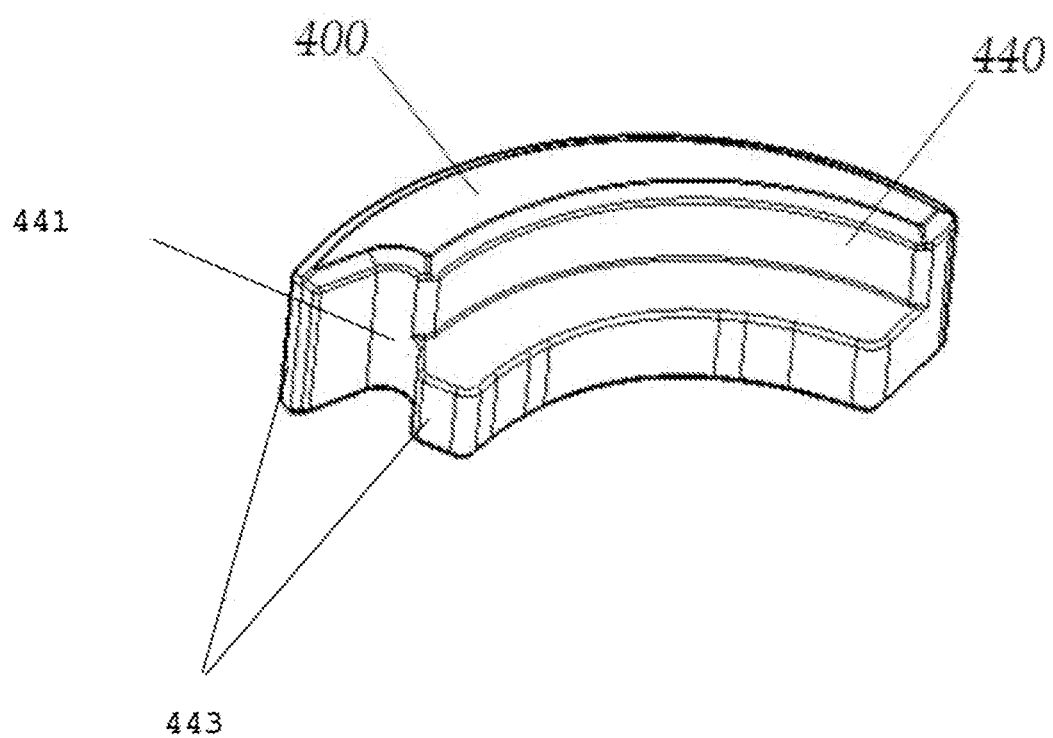
FIG. 3 is a view showing a cam of the vehicle recliner according to the embodiment of the present invention.
Figure 4:
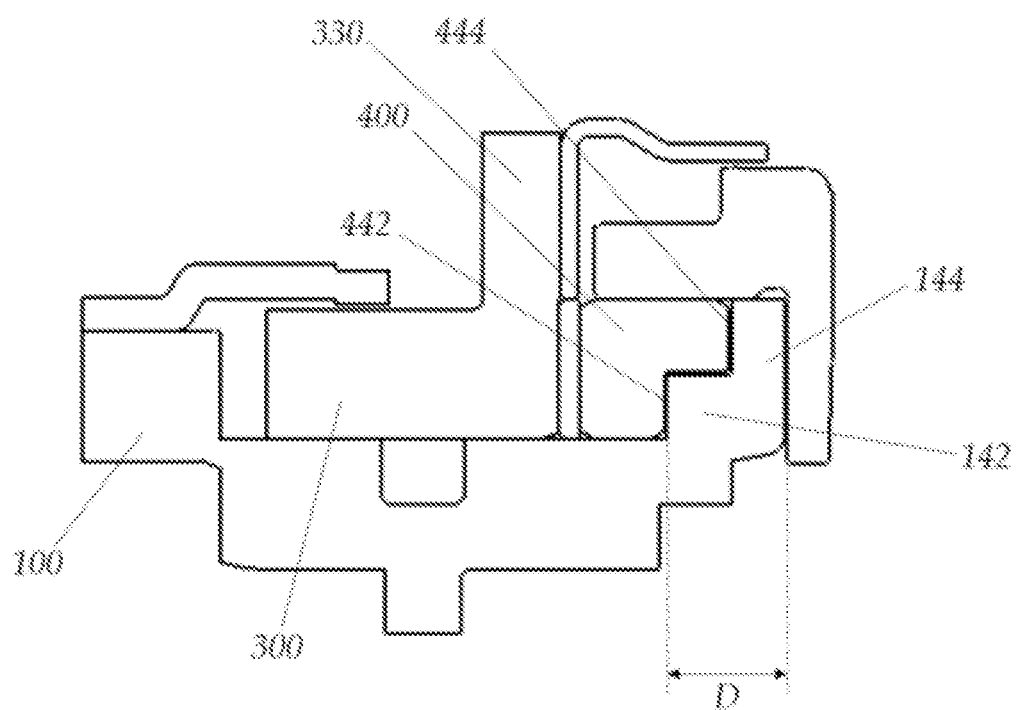
FIG. 4 is a cross-sectional side view of the vehicle recliner according to the embodiment of the present invention.

FIG. 1 is an exploded perspective view of a vehicle recliner according to an embodiment of the present invention, FIG. 2 is a view showing the assembled state of the vehicle recliner according to the embodiment of the present invention, FIG. 3 is a view showing a cam of the vehicle recliner according to the embodiment of the present invention, and FIG. 4 is a cross-sectional side view of the vehicle recliner according to the embodiment of the present invention.

First, the recliner of the present invention will be described with reference to FIGS. 1, 3, and 4.

The vehicle recliner according to the present invention includes a mobile flange 100 having an open upper portion, the open upper portion having a placement space formed therein, the mobile flange 100 including an internal gear 110 formed along the inner surface thereof forming the placement space, and a support part 140 located in the center of the placement space and configured to protrude upwards from a lower surface 120, the support part 140 being formed in a multi-step structure having a different outer diameter for each step, a cam 400 disposed in the placement space of the mobile flange 100, the cam 400 having an inner surface in contact with the support part 140, the inner surface having a corresponding step 440 formed thereon, the corresponding step 440 corresponding to the multi-step structure of the support part 140, and a gear plate 300 disposed in the placement space of the mobile flange 100 and configured to surround the outside of the cam 400, the gear plate 300 having an external gear 310 formed along the outer circumferential surface thereof, the gear plate 300 being eccentrically pressed by the cam 400 so that the external gear 310 meshes with the internal gear 110 of the mobile flange 100.

As a basic configuration of the recliner, a mobile flange is required to be provided. The mobile flange 100 is fixed to one side of a seat back or a seat cushion. The mobile flange 100 has an open upper portion, and the open upper portion thereof has a placement space formed therein. Further, the internal gear 110 is formed along the inner surface of the mobile flange 100 that forms the placement space.

Meanwhile, the support part 140, which protrudes upwards from the inner lower surface, is formed in the center of the placement space of the mobile flange 100. Here, the support part 140 is formed in a multi-step structure having a different outer diameter for each step.

Additionally, a through hole may be formed in the center of the lower surface 120 of the mobile flange 100, and the support part 140 may be formed to extend upwards from the edge of the through hole. That is, the support part 140 of the mobile flange 100 may be formed to be integrated with the mobile flange 100 through a fine-blanking method.

The mobile flange 100 may be formed by various methods, such as a casting method, a cold-forging method, and the fine-blanking method. In the case of the present invention, it is possible to secure sufficient strength of the mobile flange 100 using the fine-blanking method.

Meanwhile, the support part 140 of the mobile flange 100 may be formed to have a lower step 142 and an upper step 144 disposed at the upper portion of the lower step 142. Here, the outer diameter of the lower step 142 may be larger than that of the upper step 144. Specifically, the through hole may be formed in the center of the lower surface of the mobile flange 100, the lower step 142 may be formed inside the through hole, and the upper step 144 may be formed inside the lower step 142.

As shown in the drawing, the through hole may be formed in the center of the lower surface 120 of the mobile flange 100. The lower step 142 may be formed at a location offset upwards from the inside of the through hole, and may protrude upwards from the lower surface 120 of the mobile flange 100. The upper step 144 may be formed at a location offset upwards from the inside of the lower step 142, and may protrude upwards from the lower step 142. That is, a multi-step structure is formed in this manner, thereby making it possible to implement a shape capable of achieving sufficient strength through the fine-blanking method.

Further, in this case, since the lowermost step of the mobile flange 100 has the shape of a flat plate, it may be easy to secure materials to form the multi-step structure, and weight reduction may be achieved.

In general, since the most important factors for the moment strength of the recliner are the tooth size and the thickness of the support part (burring shape), it is required to increase the tooth thickness and the thickness of the support part in order to secure high strength thereof while satisfying the recent requirement for a recliner having a slim design. Meanwhile, when the fine-blanking method is used, the tooth thickness may be easily achieved by increasing the thickness of the material, but it is impossible to increase the thickness of the support part beyond a certain thickness thereof due to limitations of the construction method (lack of burring-shaped volume). For this reason, a relatively expensive and complicated method such as a cold-forging method is conventionally used.

In order to solve the above-described problems, in the present invention, the outer diameter of the support part is increased by adding a two-step shape to the support part, thereby increasing the overall thickness (D) of the support part and improving the lateral support thereof. Accordingly, it is possible to increase the effect of transferring a load to gear teeth with almost no deformation of the support part, thereby improving the overall strength.

Meanwhile, FIG. 3 is a view showing the cam 400 of the vehicle recliner according to the embodiment of the present invention in the state in which the cam 400 is viewed from below. The cam 400 is disposed in the displacement space of the mobile flange 100, and the inner surface thereof is in contact with the support part. Further, the cam 400 has the corresponding step 440, configured to correspond to the multi-step structure of the support part 140 and to be formed on the inner surface thereof. That is, as shown in the drawing, a part of the inner lower step of the cam 400 is recessed, thereby forming the corresponding step 440.

The cam 400 may include the corresponding step 440 formed by indenting the lower portion of the inner surface thereof that is in contact with the support part 140. Here the side surface 442 of the corresponding step 440 of the cam 400 may be offset radially outwards from an inner step 444 of the cam 400. In addition, the side surface 442 of the corresponding step 440 of the cam 400 and the inner step 444 of the cam 400 may face the respectively side surfaces of the multi-step structure of the support part 140.

That is, as shown in FIG. 4, the side surface 442 of the corresponding step 440 of the cam 400 and the inner step 444 of the cam 400 face the respective side surfaces of the multi-step structure of the support part 140, and as such, the cam 400 and the support part 140 are in stable surface contact at two points, thereby fundamentally preventing distortion occurring in the related art. Accordingly, it is possible to preemptively prevent defects, noise, and reduced strength due to point contact.

Further, in the case of such a structure, even if some numerical values are not accurate or deformation occurs, at least one of the surface contact between the side surface 442 of the corresponding step 440 of the cam 400 and the lower step 142 of the support part 140 and the surface contact between the inner step 444 of the cam 400 and the upper step 144 of the support part 140 is constantly maintained. Therefore, strength is reliably secured, operation is smooth, and durability is increased.

Meanwhile, an eccentric ring may be further disposed between the side surface 442 of the corresponding step 440 of the cam 400 and the lower step 142 of the support part 140 or between the inner step 444 of the cam 400 and the upper step 144 of the support part 140.

Additionally, the gear plate 300 includes a cylinder-shaped burring portion 330 that is vertically bent and protruded from an inner surface of the gear plate 300, the inner surface surrounding the cam 400. According to one embodiment, the cam 400 has a circular arc shape, including a longitudinal end surface 443. Further, the cam 400 includes a support groove 441 disposed and recessed at the middle of the longitudinal end surface 443, the support groove being configured to be pressed by a spring.

The present invention provides a vehicle recliner, configured to form a multi-step structure in a support part that supports a cam of a mobile flange and to form a step structure corresponding to the multi-step structure of the support part in the cam corresponding to the support part through a relatively simple process. Accordingly, while the strength of the recliner is increased, the weight of the recliner is reduced and the recliner is formed to a compact size, thereby reducing manufacturing costs.

As is apparent from the above description, according to a vehicle recliner of the present invention, a multi-step structure is formed in a support part configured to support a cam of a mobile flange, and a step structure corresponding to the multi-step structure of the support part is formed in the cam corresponding to the support part through a relatively simple process, thereby increasing the strength of the recliner, reducing the weight of the recliner, forming the recliner to a compact size, and reducing manufacturing costs.

Although the preferred embodiments of the present invention have been disclosed for illustrative purposes, those skilled in the art will appreciate that various modifications, additions, and substitutions are possible, without departing from the scope and spirit of the invention as disclosed in the accompanying claims.

What is claimed is:

1. A vehicle recliner comprising:
a mobile flange having an open upper portion, the open upper portion having a placement space formed therein, the mobile flange including an internal gear formed along an inner surface thereof forming the placement space and a support part located in a center of the placement space and configured to protrude upwards from a lower surface thereof, the support part being formed in a multi-step structure having multiple steps, each step having a different outer diameter from one another;
a cam disposed in the placement space of the mobile flange, the cam having an inner surface in contact with the support part, the inner surface having a corresponding step structure formed thereon, the corresponding step structure corresponding to the multi-step structure of the support part; and
a gear plate disposed in the placement space of the mobile flange and configured to surround an outside of the cam, the gear plate having an external gear formed along an outer circumferential surface thereof, the gear plate being eccentrically pressed by the cam so that the external gear meshes with the internal gear of the mobile flange,
wherein the lower surface of the placement space of the mobile flange is formed as a plane, and
wherein a lower end of the gear plate and a lower end of the cam are supported on the lower surface of the placement space on the same plane.

2. The vehicle recliner according to claim 1, wherein:
the mobile flange has a through hole formed in a center of the lower surface thereof, and
the support part is formed to extend upwards from an edge of the through hole.

3. The vehicle recliner according to claim 1, wherein the support part is formed to be integrated with the mobile flange through a fine-blanking method.

4. The vehicle recliner according to claim 1, wherein:
the multi-step structure of the support part comprises a lower step and an upper step disposed at an upper portion of the lower step, and the lower step has an outer diameter thereof larger than an outer diameter of the upper step.

5. The vehicle recliner according to claim 4, wherein:
the mobile flange has a through hole formed in a center of the lower surface thereof,
the lower step is formed inside the through hole, and
the upper step is formed inside the lower step.

6. The vehicle recliner according to claim 4, wherein:
the mobile flange has a through hole formed in a center of the lower surface thereof,
the lower step is formed at a location offset upwards from an inside of the through hole and protrudes upwards from the lower surface of the mobile flange, and
the upper step is formed at a location offset upwards from an inside of the lower step and protrudes upwards from the lower step.

7. The vehicle recliner according to claim 4, wherein the lower step of the mobile flange has a flat-plate shape.

8. The vehicle recliner according to claim 1, wherein the corresponding step structure of the cam is formed by indenting a lower portion of the inner surface in contact with the support part, and the corresponding step structure includes a corresponding step corresponding to an upper step of the multi-step structure of the support part.

9. The vehicle recliner according to claim 8, wherein a side surface of the corresponding step of the cam is offset radially outwards from an inner step of the cam.

10. The vehicle recliner according to claim 8, wherein a side surface of the corresponding step of the cam and an inner step of the cam face respective side surfaces of the multi-step structure of the support part.

11. A vehicle recliner comprising:
a mobile flange having an open upper portion, the open upper portion having a placement space formed therein, the mobile flange including an internal gear formed along an inner surface thereof forming the placement space and a support part located in a center of the placement space and configured to protrude upwards from a lower surface thereof, the support part being formed in a multi-step structure having multiple steps, each step having a different outer diameter from one another;
a cam disposed in the placement space of the mobile flange, the cam having an inner surface in contact with the support part, the inner surface having a corresponding step structure formed thereon, the corresponding step structure corresponding to the multi-step structure of the support part; and
a gear plate disposed in the placement space of the mobile flange and configured to surround an outside of the cam, the gear plate having an external gear formed along an outer circumferential surface thereof, the gear plate being eccentrically pressed by the cam so that the external gear meshes with the internal gear of the mobile flange,
wherein an eccentric ring is disposed between the side surface of the corresponding step of the cam and a lower step of the support part or between the inner step of the cam and an upper step of the support part.

12. A vehicle recliner comprising:
a mobile flange having an open upper portion, the open upper portion having a placement space formed therein, the mobile flange including an internal gear formed along an inner surface thereof forming the placement space and a support part located in a center of the placement space and configured to protrude upwards from a lower surface thereof, the support part being formed in a multi-step structure having multiple steps, each step having a different outer diameter from one another;
a cam disposed in the placement space of the mobile flange, the cam having an inner surface in contact with the support part, the inner surface having a corresponding step structure formed thereon, the corresponding step structure corresponding to the multi-step structure of the support part; and
a gear plate disposed in the placement space of the mobile flange and configured to surround an outside of the cam, the gear plate having an external gear formed along an outer circumferential surface thereof, the gear plate being eccentrically pressed by the cam so that the external gear meshes with the internal gear of the mobile flange,
wherein the gear plate includes a cylinder-shaped burring portion vertically bent and protruded from an inner surface thereof, the inner surface surrounding the cam,
wherein the cam includes a longitudinal end surface and a support groove disposed at and recessed from a middle of the longitudinal end surface, and
wherein the support groove is configured be pressed by a spring.

* * * * *